(12) United States Patent
Lee et al.

(10) Patent No.: US 6,217,713 B1
(45) Date of Patent: Apr. 17, 2001

(54) PROCESS FOR PRODUCING AQUAFUEL BY USING CARBON FIBER BUNDLE ELECTRODES

(75) Inventors: Chi-Young Lee, Hsin-Chu Hsien; Swe-Kai Chen; Nyan-Hwa Tai, both of Hsin-Chu, all of (TW)

(73) Assignee: National Science Council of Republic of China, Taipei (TW)

( * ) Notice: Subject to any disclaimer, the term of this patent is extended or adjusted under 35 U.S.C. 154(b) by 0 days.

(21) Appl. No.: 09/108,976

(22) Filed: Jul. 2, 1998

(51) Int. Cl.$^7$ ...................................................... B01J 19/08
(52) U.S. Cl. .......................... 204/164; 205/638; 205/637
(58) Field of Search ............................ 204/164; 205/638, 205/637

(56) References Cited

U.S. PATENT DOCUMENTS 5,417,817 * 5/1995 Dammann et al. .................. 204/164
5,792,325 * 8/1998 Richardson, Jr. .................... 204/164

* cited by examiner

Primary Examiner—Kishor Mayekar
(74) Attorney, Agent, or Firm—Bacon & Thomas, PLLC

(57) ABSTRACT

The invention concerns a process for producing aquafuel by replacing conventional inflexible carbon bars with thin, flexible and tough carbon fiber bundles as consumptive electrodes which thereby can be sustainedly fed and can produce aquafuel continuously. Such carbon fiber bundle electrodes can be prepared by pultrusion, and electrodes may be further carbonized or graphitized in order to increase the conductivity and gas productivity thereof.

9 Claims, 3 Drawing Sheets

PROCESS FOR PRODUCING AQUAFUEL BY USING CARBON FIBER BUNDLE ELECTRODES

BACKGROUND OF THE INVENTION

1. Field of The Invention

The invention relates to a process for producing aquafuel by using carbon fiber bundle electrodes, and in particular, to a process for producing aquafuel by auto-feeding flexible carbon fiber bundle electrode in an electrolytic reaction, wherein said flexible carbon fiber bundle electrodes are formed by impregnating flexible, tough carbon fibers with a resin and said electrode can be used sustainedly in the electrolytic reaction of water under low voltage for a long period of time.

2. Description of the Prior Art

In the early stage of searching for new energy sources, coal had been reacted with water to produce clean water gas energy, while, in the later stage, electrolysis of water has been utilized to produce clean hydrogen energy. In the reaction of electrolyzing water, an arc can be generated in the water if carbon bars are used as the electrodes and the distance between electrodes is reduced. Because of the great amount of heat generated by the arc, carbon may involve in the decomposition reaction of water so that the electric energy required to supply for electrolyzing water can be significantly reduced. This renders water electrolysis a good potential method for providing energy sources.

Although electrolytic reaction of water by using carbon bars as electrodes can lower greatly the power supply, the carbon electrodes become a consumptive materials which must be supplemented continuously in the course of reaction. In fact, it is not easy to supply the inflexible long carbon bar used in commercial applications doe to space limitation.

Production of clean hydrogen energy by reacting coal or other solid carbonaceous fossil fuel with water had been the subject of efforts by scientists in the early 1960s.

In the early stage, carbon and water should be heated to 800° C. for reacting into hydrogen and carbon dioxide. It has been found later that electrolysis of water can produce clean hydrogen, too. However, to generate one mole of hydrogen it should consume an amount of energy of 56.7 kcal.

Coughlin and Farooque (Nature, 279, 301, 1979) proposed an electrolytic reaction of water in a coal slurry by using platinum bar as electrodes and sulfuric acid as the electrolyte, whereby, because the involvement of carbon in the reaction, energy input required for generating one mole of hydrogen can be reduced from the above-said 56.7 kcal down to 9.5 kcal. Dammann in U.S. Pat. No. 5,159,900 (1992) disclosed the production of hydrogen gas and carbon monoxide through the generation of an arc in water by means of carbon bars and used those gases to drive an internal combustion engine, wherein, gases produced in said reaction are water and carbon dioxide.

Richardson in U.S. Pat. No. 5,435,274 (1995) disclosed power generation by using the gas produced through an arc in water by means of carbon electrode bars, wherein the electric power thus generated is five times more than that of input. Maflove (Infinite Energy, 9, 44, 1996) reported the above-said system, which can generate an arc with a temperature ranging from 3000° C. to 4000° C. to decompose water into hydrogen and oxygen that reacts with carbon of carbon electrodes to produce aquafuel gases.

In the combustion of those aquafuel gases for power generation, the ratio of air to aquafuel gases is 3:1 to 5:1. The waste gas produced therefrom is astonishingly lower than that produced from combustion of gasoline so that a cleaner waste gas can be obtained. This renders it a good potential method of energy source production and utilization.

In the above-described systems for generating aquafuel gases, carbon electrode bars and water are consumptive raw materials that must be supplemented continuously in the course of aquafuel production.

In general, water supply is easier whereas the supply of inflexible long carbon bars might be more difficult after a long period of utilization.

Accordingly, a problem of carbon electrode supplementing has arisen in the above-said systems for producing aquafuel. In view of this, it is desirable to use a flexible carbon electrode to overcome the problem associated with sustained uses over a long period of time.

SUMMARY OF THE INVENTION

In view of the disadvantages associated with conventional techniques, the inventor has found, by auto-feeding a flexible carbon fiber bundle electrode instead of the inflexible carbon bar electrode used in conventional electrolytic reaction of water, the problem of carbon electrode supplement can be overcome and an improved process for producing aquafuel according to the invention is thus established.

Accordingly, the object of the invention is to provide a process for producing aquafuel by using auto-feeding carbon fiber bundle electrodes in an electrolytic reaction of water, said process is characterized in that said carbon fiber bundle electrode is a flexible and tough carbon fiber bundle formed by impregnating a bundle of carbon fibers having a diameter of 5~15 $\mu$m with resin and shaping continuously, and said electrolytic reaction of water is carried out at a low voltage of 20~30 V to produce an aquafuel comprising predominantly hydrogen and carbon monoxide.

BRIEF DESCRIPTION OF THE DRAWINGS

The drawings disclose an illustrative embodiment of the present invention that serves to exemplify the various advantages and objects hereof, and are listed as follows.

DETAILED DESCRIPTION OF THE PREFERRED EMBODIMENT

Figure 1:
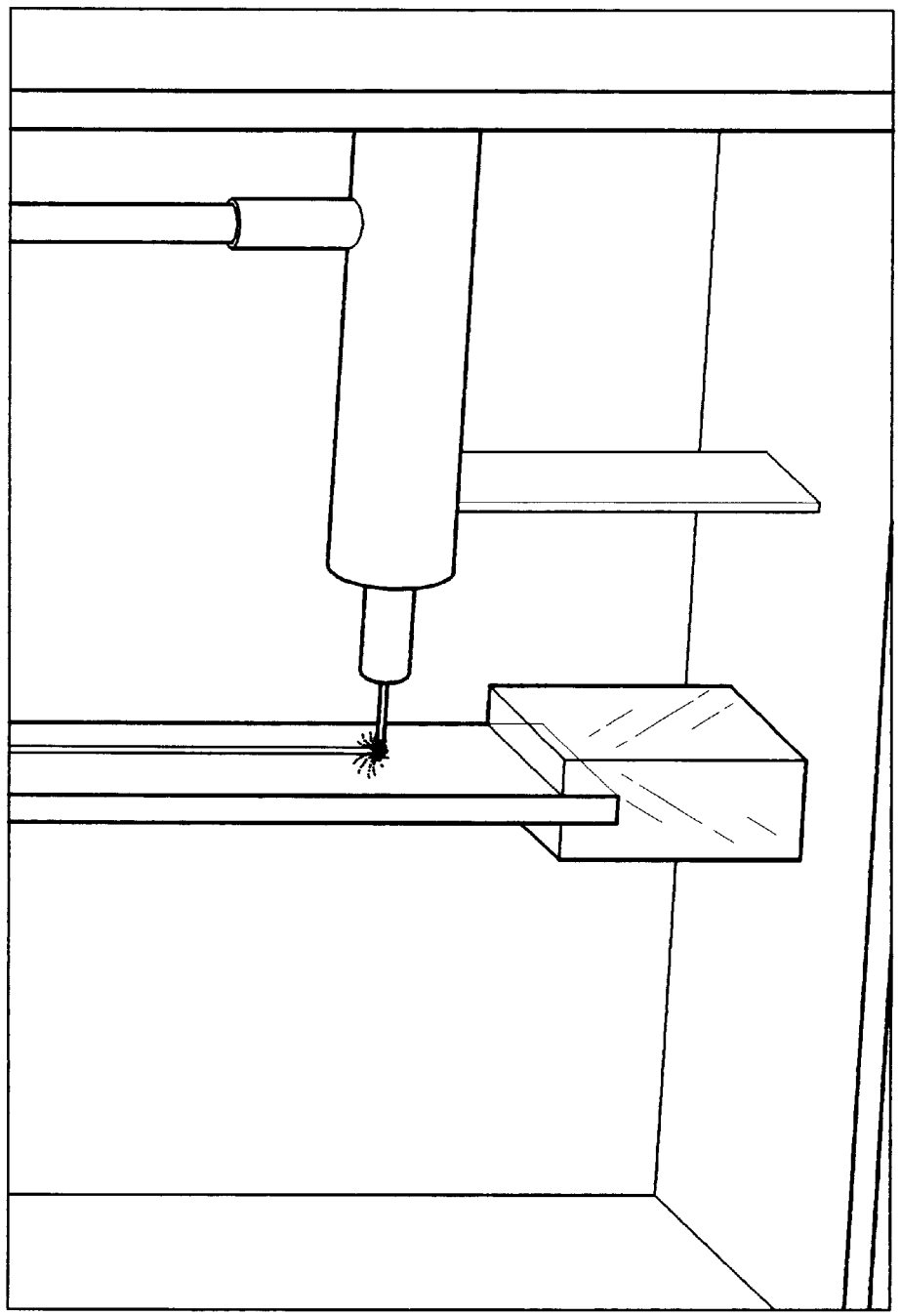
FIG. 1 shows schematically an apparatus for generating an arc by using a carbon fiber bundle electrode.

As described above, the invention provides a process for producing aquafuel by using auto-feeding carbon fiber bundle electrode in an electrolytic reaction of water.

The inventor of this application has found that, because of high conductivity of carbon/carbon composite, thin rod-shape carbon fiber bundles made of carbonized or graphitized composite can be used in the invention as electrodes instead of conventional carbon bar electrodes. Because of the intrinsic flexible characteristic possessed by said thin rod-shape carbon fiber bundles, they can be wound into a coil and be used sustainedly over a long period of time such that the problem of electrode supplement can be overcome.

Furthermore, the above-described flexible carbon fiber bundle can be fed sustainedly by an auto-feeding apparatus and thus makes possible the continuous production of aquafuel over a long period of time.

Moreover, thin rod-shape carbon fiber bundle composites without subjecting to carbonized or graphitized can also be used as electrodes for arc discharging.

In addition, through using thin rod-shape carbon fiber bundle composites reinforced by high modulus carbon fiber as electrodes, the difficulty of continuously supplementing electrodes over a long period of time due to the inability to bend carbon bars can be solved.

In summary, there are three types of materials used as the electrode in the process according to the invention. Namely, the first one comprises a thin rod-shape carbon fiber bundle made by carbon fiber-reinforced phenolic resin; the second type electrode is obtained by carbonizing the above-said first type electrode at high temperature, e.g., 1100° C., under high purity nitrogen atmosphere; and the third type electrode can be obtained by graphitizing the first type electrode at 2200° C. under high purity inert gas atmosphere, wherein, in the course of heating to 2200° C., different high purity inert gas atmosphere are used, e.g., nitrogen gas is used at a temperature of less than 1700° C., argon atmosphere is used at temperatures from 1700 to 2100° C., following helium atmosphere at a temperature higher than 2100° C.

According to the invention, suitable resins, for example thermoplastic resins and thermosetting resins, are used in the pultrusion process for forming flexible and tough carbon fiber bundle electrode. Examples of suitable thermoplastic resins include polyetheretherketone, petroleum pitch, coal tar pitch, polystyrene, polyvinyl alcohol, polyacrylonitrile, and the like, whereas examples of suitable thermosetting resins include phenolic, furan, epoxy, unsaturated polyester, polyimide, and the like.

In addition, the above-said carbon fiber bundle electrode can also be impregnated with natural rubber, modified rubber, synthetic rubber, and the like.

Optionally, the above-said resins suitable for impregnating carbon fiber bundle electrodes used in the process according to the invention can be contains as an additive carbon powder or other powders which benefit conductivity or promote efficiency of gas production.

Conventional pultrusion technique can be used in the preparation of the carbon fiber bundle electrodes used in the process according to the invention. In the process, a bundle of carbon fiber (e.g., about 6000 fibers) is introduced through a resin bath containing suitable resin described above. After the carbon fiber bundle is adequately impregnated with the resin, the bundle is guided through a resin controller to remove excess resin from the carbon fiber bundle, thus the ratio of resin to carbon fiber can be controlled. The bundle is then guided through a shaping die to form the carbon fiber bundle into a desired shape of cross section such as I-shape, L-shape, circular and the like. After shaping, the bundle is conducted into an oven for curing to complete the pultrusion process. In general, the components fabricated through pultrusion are used mostly as structural materials and have typically larger size, e.g., 1.00 cm or more.

Figure 3:
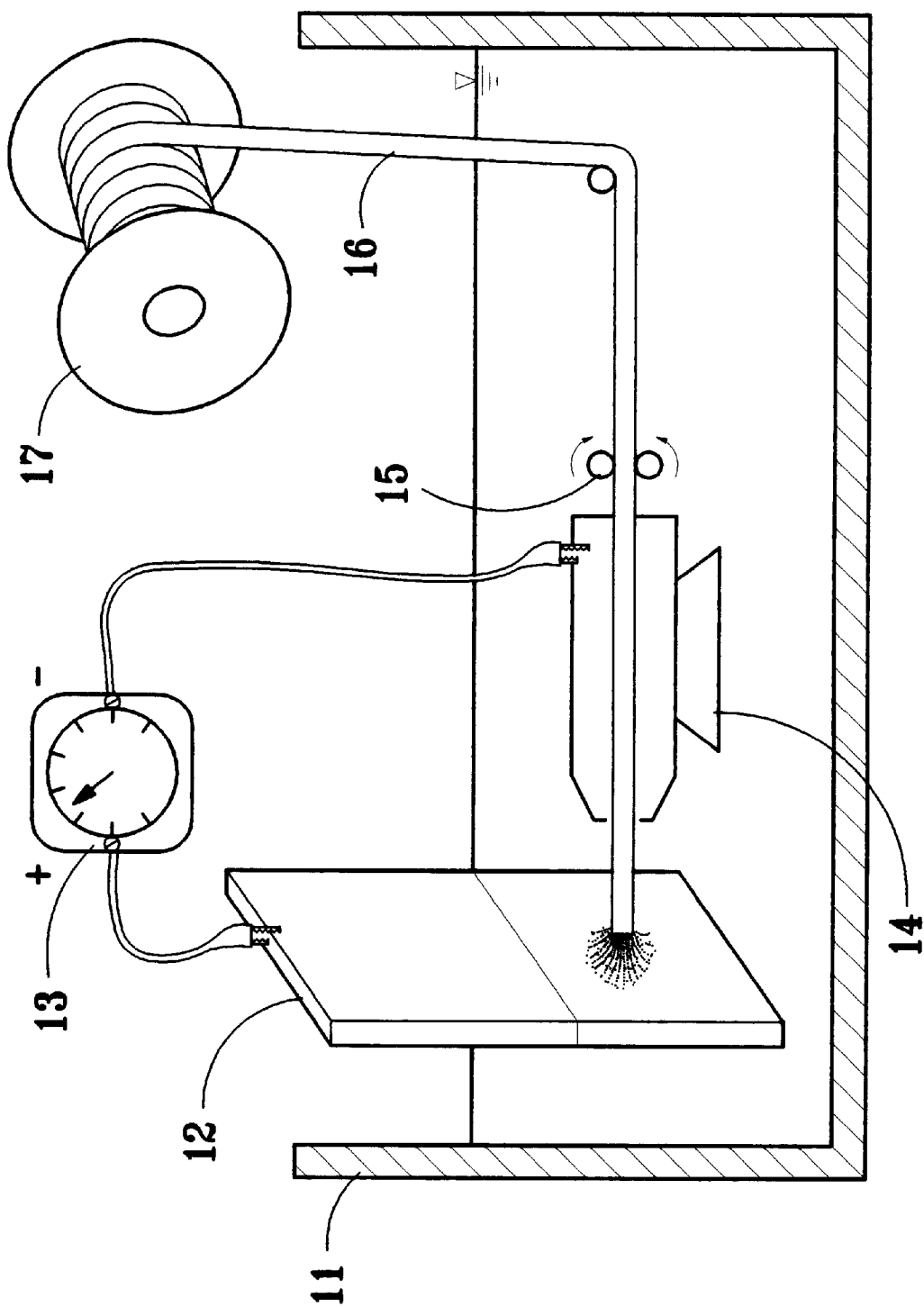
FIG. 3 shows schematically the auto-feeding apparatus used according to the invention.

Electrodes used in the process according to the invention are thin circular rod in shape, which are produced by pultrusion and have a diameter of 0.08 cm. Due to their relatively small diameter they exhibit excellent flexibility, because flexibility is inversely proportional to the fourth power of the cross sectional area. Moreover, the fibers in bundle exhibit high tensile modulus which enhances flexibility further. However, a graphite pencil lead with a diameter as thin as 0.05 cm manifests a low flexibility because the lower the tensile modulus is, the lower the flexibility will be. As illustrated in FIGS. 3 and 4, wherein, (a) is a carbon fiber bundle without subjecting to carbonization or graphitization. The carbon fiber bundle with a diameter of 0.08 cm can be wound into a circle with a curvature radius of about 5 cm; (b) is a graphite pencil lead with a diameter of 0.05 cm; and (c) is a carbon bar with a diameter of 0.42 cm, and both of (b) and (c) can not bent at all.

In the past, inflexible carbon bar was adopted for producing aquafuel, therefore, during continuous long time operation, frequent replacement of carbon bars due to the consumption thereof will introduce inconvenience for the engineering application thereof.

Furthermore, because the electrodes used in the process according to the invention are thin rod-shape carbon fiber bundle reinforced by carbon fiber, and because those carbon fibers exhibit relatively good flexibility, they can be wound into a coil, which prolong and sustain supplementing the consumption of electrodes.

FIG. 5 shows schematically such an auto-feeding apparatus, which comprises a water tank 11, a thick carbon plate 12, a power supply 13, an electrode support 14, an auto-feeding roll 15 driven by a motor, a carbon fiber bundle 16, and a winding mandrel 17.

Figure 2:
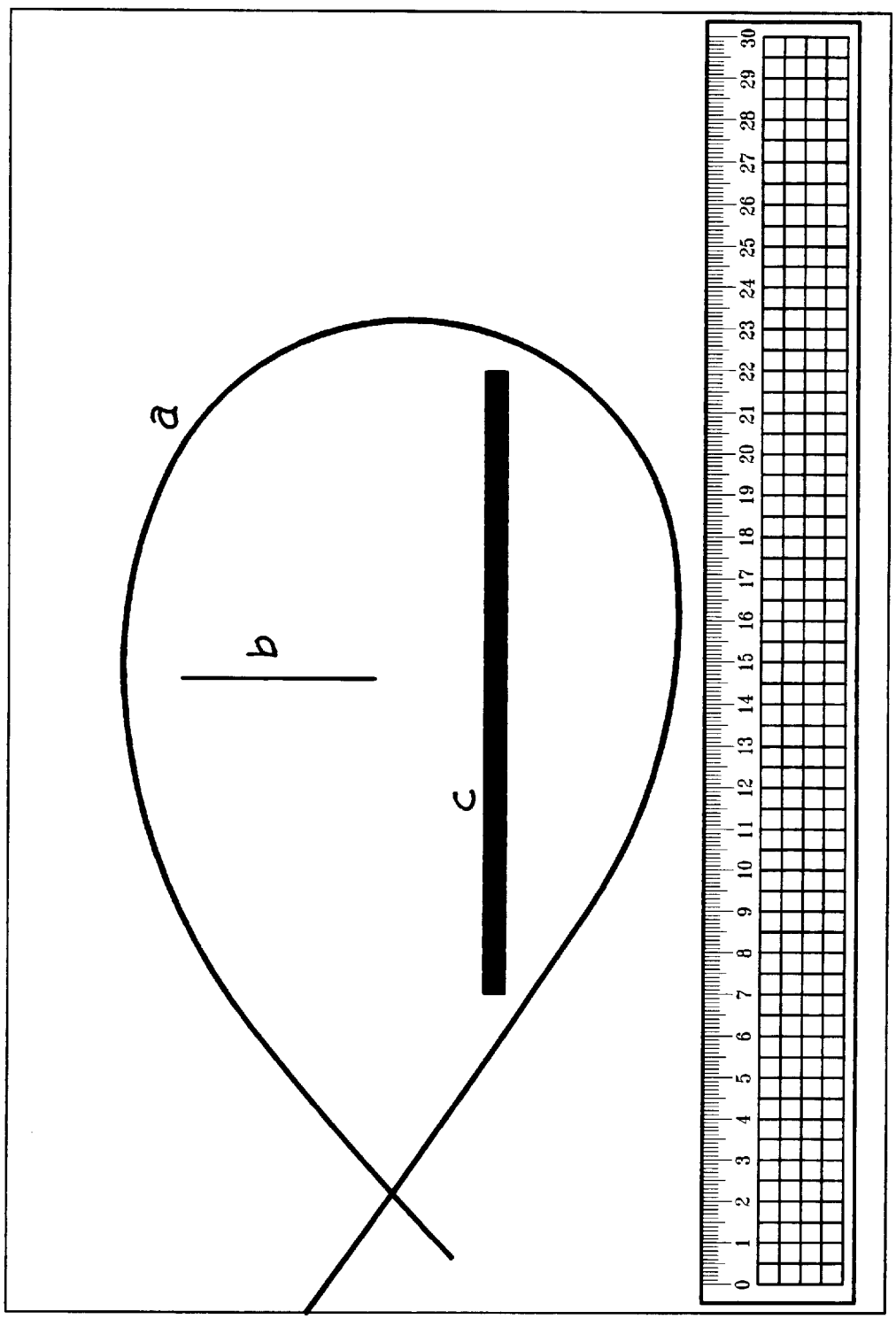
FIG. 2 exhibits the comparison of flexibility of (a) a carbon fiber bundle having a diameter of 0.08 cm, (b) a graphite pencil lead having a diameter of 0.05 cm, and (c) a carbon bar having a diameter of 0.42 cm.

In the process for producing aquafuel according to the invention, the inventor of the application find that, by adjusting the distance between carbon fiber bundle electrodes, an arc can be generated in water under a low voltage of 20 to 30 V and thereby aquafuel gases comprising predominantly hydrogen and carbon monoxide can be produced, as shown photographically in FIGS. 1 and 2. In an embodiment of the invention as depicted in FIGS. 1 and 2, a carbon fiber bundle electrode with a diameter of 0.08 cm was used at a voltage of 20 V to generate an arc and produce gases which can be collected and used as fuel.

Many changes and modifications in the above-described embodiment of the invention can, of course, be carried out without departing from the scope thereof. Accordingly, to promote the progress in science and the useful arts, the invention is disclosed and is intended to be limited only by the scope of appended claims.

What is claimed is:

1. A process for producing aquafuel, said process is characterized in that it comprises using flexible and tough carbon fiber bundle electrodes in water and applying a voltage of 20~30 V to the electrodes to generate an arc and to produce an aquafuel containing predominantly hydrogen and carbon monoxide.

2. A process as in claim 1, wherein said flexible and tough carbon fiber bundle electrodes are formed of a material pultruded with a carbon fiber bundle containing thousands of carbon fibers each having a diameter of 5~15 $\mu$m, and is impregnated with resins.

3. A process as claimed in claim 2, wherein said flexible and tough carbon fiber bundle electrode has a cross section shape and size for auto-feeding thereof and promoting the productivity of aquafuel.

4. A process as in claim 2, wherein said resins used for impregnating said flexible and tough carbon fiber bundle electrode includes thermosetting resins or thermoplastic resins.

5. A process as in claim 4, wherein said thermosetting resins comprise phenolic, furan, epoxy, unsaturated polyester, or polyimide resins.

6. A process as in claim 4, wherein said thermoplastic resins comprise polyetheretherketone, petroleum pitch, coal tar pitch, polystyrene, polyvinyl alcohol or polyacrylonitrile resins.

7. A process as in claim 2, wherein techniques used for preparing said flexible and tough carbon fiber bundle electrode comprise pultrusion.

8. A process as in any of claims 1 to 7, comprises further carbonizing said flexible and tough carbon fiber bundle electrode at a temperature ranging from 1000 to 2200° C. in a high purity inert atmosphere.

9. A process as in any of claims 1 to 7, comprises further graphitizing said flexible and tough carbon fiber bundle electrode at a temperature higher than 2200° C. in a high purity inert atmosphere.

* * * * *